April 5, 1966 G. J. SHELDON 3,244,776
METHOD OF FORMING APERTURED OPTICAL DISCS
Filed Sept. 21, 1961 3 Sheets-Sheet 1

INVENTOR.
GILBERT J. SHELDON
BY Arthur L. Nelson
Frank C. Parker
ATTORNEYS

April 5, 1966 G. J. SHELDON 3,244,776
METHOD OF FORMING APERTURED OPTICAL DISCS
Filed Sept. 21, 1961 3 Sheets-Sheet 3

SHEET 3 OF
3 SHEETS

INVENTOR.
GILBERT J. SHELDON
BY
ATTORNEYS

United States Patent Office 3,244,776
Patented Apr. 5, 1966

3,244,776
METHOD OF FORMING APERTURED OPTICAL DISCS
Gilbert J. Sheldon, Irondequoit, N.Y., assignor to Bausch & Lomb Incorporated, Rochester, N.Y., a corporation of New York
Filed Sept. 21, 1961, Ser. No. 139,806
3 Claims. (Cl. 264—1)

This invention relates to aperture discs and more particularly to a method of forming an aperture in a disc.

The formation of an aperture requires very exacting means to provide uniformly of size and shape. With a reduction in the size of the aperture the problem of keeping the aperture free from foreign material becomes increasingly difficult. Also during cleaning the inner periphery of the aperture, a burr is often raised which requires removal. The aperture disc made by the method covered under this invention is intended to overcome these problems.

A solid light transmitting medium is surrounded by an opaque material to form a pin-hole aperture which may be readily cleaned, and which provides the desired size of aperture for transmission of a predetermined quantity of light.

It is an object of this invention to provide a method for placing a transparent fiber in an opaque substance to form an aperture.

It is another object of this invention to provide a method of filling an aperture with a transparent material for transmission of light.

It is a further object of this invention to provide a method of fusing an opaque substance to encase a transparent fiber to form an aperture.

The objects of this invention are accomplished by placing a transparent fiber within an opaque substance in a manner to form an air-tight encasement about the transparent fiber. The opaque substance may be of a liquid nature which hardens upon cooling, or the opaque substance may be also in the nature of a compound the same as the transparent fiber and the total mass is fused to form an integral unit. Subsequent to formation of the integral unit sections of the fused mass may be then cut to the desired thickness to form discs which are used as an aperture. The discs are then polished to form a smooth planar surface which readily transmits light from one surface to the other to provide an aperture of the desired size required for the use intended for the aperture.

The following illustrations and descriptions set forth the preferred embodiment of this invention. Any modification of the preferred embodiment within the principles as illustrated and described in the following paragraphs are considered to be within the score of this invention.

FIGS. 1 through 5 illustrate the preferred embodiment of which FIG. 1 illustrates a means for perforating a plate of opaque material.

FIG. 2 illustrates the alignment of the two perforated plates and placing these plates in spaced relation to each other.

FIG. 3 illustrates a means for extending a fiber through the perforations in the aligned plates.

FIG. 4 illustrates a means for filling the spaces between the perforated plates with an epoxy resin.

FIG. 5 illustrates a means for grinding and polishing the plurality of units fabricated of the two plates and the fiber.

FIGS. 6 through 11 illustrates a modification of the previously illustrated method of which FIG. 6 illustrates etching means for etching a longitudinal groove on a planar surface of an opaque glass.

FIG. 7 is a cross section view taken on line 7—7 of FIG. 6.

FIG. 8 illustrates a means for attaching a fiber under tension on an opaque plate and positioning a second plate for fusion on the first plate.

FIG. 9 illustrates a means for fusing the second opaque plate on the first plate and encasing the glass fiber intermediate of the two plates.

FIG. 10 illustrates a diamond saw employed as a means for cutting wafers from the fabricated unit.

FIG. 11 is a polishing and grinding means for providing a smooth planar surface on the ends of the wafers.

FIGS. 12 through 16 illustrate a second modification of a method for making pin-hole apertures of which FIG. 12 illustrates the insertion of an optically insulated fiber within a hollow opaque member.

FIG. 13 is a cross section view illustrating the optically insulated fiber seated within the hollow opaque member.

FIG. 14 illustrates a means for elongating the fiber and the tubular opaque member during fusing of the fiber to the tube and forming an integral structure.

FIG. 15 illustrates a means for cutting sections of a unitized fused fiber and the hollow rod.

FIG. 1 illustrates a grinding and polishing means for a plurality of the sections cut as illustrated in FIG. 15.

Figure 1:
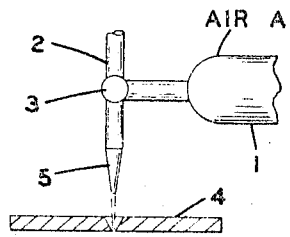
Figure 2:
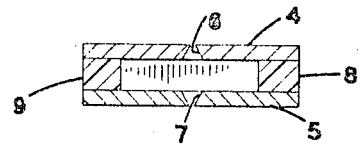

Referring to FIGS. 1 through 5 the original version of forming pin-hole apertures is illustrated. The method for forming the apertures is set forth in the steps shown in the steps shown in FIGS. 1 through 5. FIG. 1 illustrates an air abrasive unit which projects a stream of particles to impinge on a plate for the perforating of opaque plate. The air abrasive unit includes a tank 1 containing pressurized air. The conduit 2 leads to a supply of abrasive particles. The valve 3 controls the direction and the amount of pressure and particles directed toward the opaque plate 4. The nozzle 5 controls the stream of particles to perforate the plate 4. Two plates of the same dimension are perforated and then aligned as illustrated in FIG. 2.

FIG. 2 illustrates the opaque plates with the axial centers of the perforations 6 and 7 aligned to receive a fiber which is extended to form a straight line. The spacers 8 and 9 are positioned between the plates 4 and 5 to maintain a constant distance between plates.

The plates 4 and 5 may be constructed of a material such as stainless steel or a glass commonly known as welding glass due to its opaque property. One important characteristic the composition being that it can be readily bonded together by an epoxy resin or such bonding agent which is filled within the space between the plates.

Figure 3:
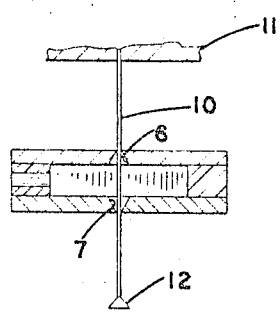

FIG. 3 illustrates a step whereby an optically insulated fiber 10 is placed under tension through the axially aligned perforations 6 and 7. The fiber is held by a support 11 and a weight 12 may be placed on its opposite end to maintain a tension as it is held within the axially aligned holes 6 and 7.

Figure 4:
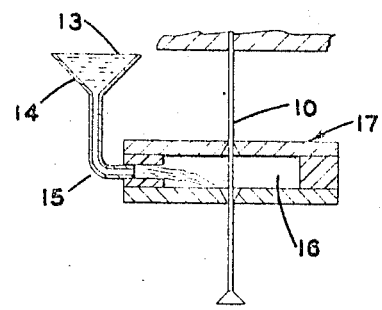

FIG. 4 illustrates the plates and the optically insulated fiber 10 received within the perforations in a position which is ready for reception of the epoxy resin 13. The epoxy resin is held in a container 14 having a conduit 15 which feeds the liquid epoxy resin into the chamber 16 between the two plates. The epoxy resin is forced into the cavity filling all spaces between the external planar surfaces of the plates 4 and 5 as the air escapes around the fiber or through any suitable opening means. The resin hardens and the unitized structure is then opaque except for the optically insulated fiber 10 which extends in a straight line through the unit.

Figure 5:
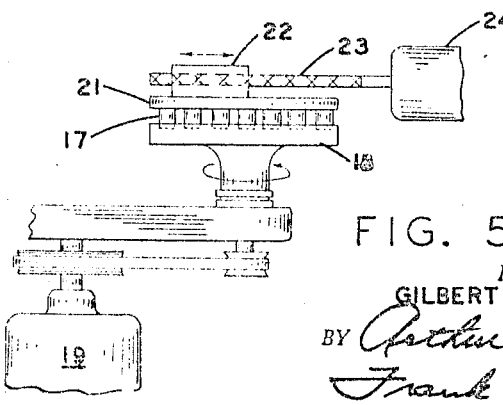

Referring to FIG. 5 a plurality of the unitized structures 17 are then placed on a rotating plate 18 which is connected to a motor 19 to provide a rotary motion to the plate 18. The plurality of unitized structures 17 are fastened to the plate 18. The device as illustrated provides a recess within the plate 18 to maintain a fixed position relative to the rotating plate 18. The plate 21 is connected to a block 22 having an internal threaded opening for reception of the double screw arrangement on the rod 23. The rod 23 is rotated by the motor 24 to provide a reciprocating motion while the rotary motion of the plate 18 is in operation. In this manner a compound grinding and polishing motion is created on the plurality of unitized elements to provide a smooth surface on the sides of the unitized elements 17. When the polishing is completed on the one surface the unitized element is inverted and the second planar surface on the opposite side is then polished to provide a smooth light transmitting surface on each end of the optically insulated fiber 10. The inventor does not wish to limit the process to this type of polishing, the disclosure is merely illustrative.

Figure 7:
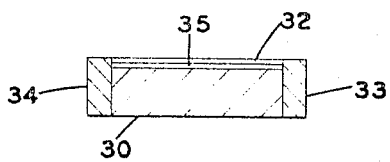
Figure 6:
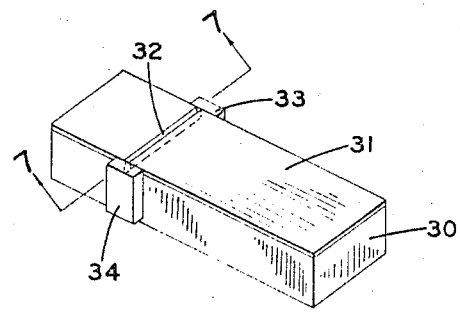
Figure 8:
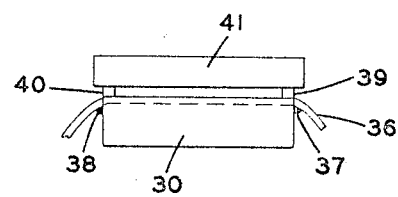

FIGS. 6 through 11 illustrate a modification whereby an opaque glass plate 30 is coated with a layer of wax 31. The wax is then scratched from a portion of a surface to form a recess 32. The blocks 33 and 34 are then placed to abut the surfaces on the lateral surfaces of the plate 30. This is more clearly illustrated in FIG. 7. The recess 32 formed in the wax is then filled with an acid as shown in FIG. 7. The acid is permitted to remain in this position to form an etched groove 35 on the planar surface of the plate 30. It is of course necessary that the acid used be of the type such hydrofluoric acid which will etch a groove in the glass plate. The glass plate must also be opaque to prevent light transmission once the assembly is fused for encasement of an optically insulated fiber.

When the desired depth of the groove 35 is etched within the planar surface of the opaque glass plate 30, the acid is then removed and the wax is scraped from the surface of the plate 30. An optically insulated fiber 36 is elongated through a tension means and placed within the recess 32. The tension on the fiber 36 is maintained by placing patches of cement 37 and 38 to connect the two ends of the fiber with the lateral surfaces on the plate 30. The fiber is permanently maintained under tension in this manner. Two spacers 39 and 40 are then placed on the planar surface adjacent the groove 35 to maintain the spaced relation betwen the opaque glass plate 30 and a second opaque glass plate 41 as it is positioned on the two spacers 39 and 40. The reason for the spacers 39 and 40 is to cause the central portion of a plate 41 to contact plate 30 prior to the extreme ends of the plate 41 as the heat is supplied on the upper surface of the plate 41 and the glass softens.

Figure 9:
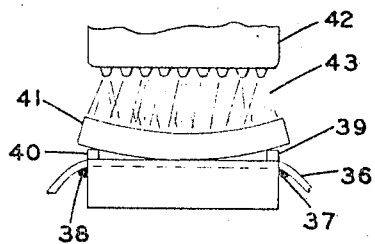

Referring to FIG. 9 the plate 41 is positioned on top of the spacers 39 and 40 which are supported by the plate 30. The gas burner 42 provides a heating means with the impingement of the flames 43 on the upper planar surface of the plate 41. As the opaque plate 41 softens the plate sags to contact the center portion of the plate 30 and a fusion begins at this point and works gradually to the sides of the plate 30 forcing any gases to be expelled prior to the fusion of the plates 30 and 41 which enclose the optically insulated fiber 36. A complete fusion of the plates 30 and 41 and the optically insulated fiber 36 unitizes the structure.

Figure 10:
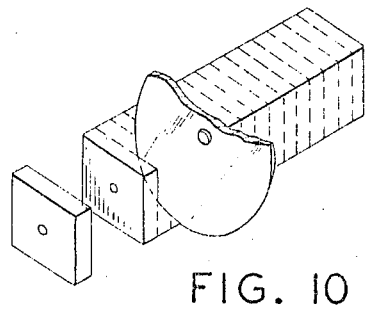

FIG. 10 illustrates a unitized structure of the plates 30 and 41 fused together with the optically insulated fiber 36. A cutting means is then employed to cut discs of the unitized structure as indicated. Any desired thickness of a disc may be cut in this manner.

Figure 11:
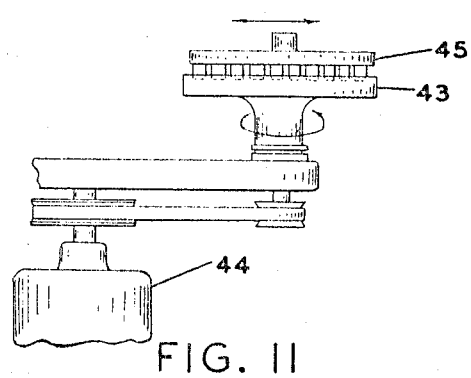

FIG. 11 illustrates a plurality of the discs positioned on the rotatable plate 43 which is rotated by a motor means 44. A reciprocating motion is applied to the plate 45.

Figure 12:
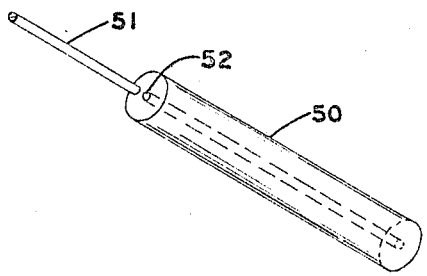

FIGS. 12 through 16 illustrate a further modification whereby an optically insulated fiber is inserted in a thick walled tube and then fused to form a unitized structure. Referring to FIG. 12 an opaque glass tube 50 receives an optically insulated fiber 51. The optically insulated fiber is inserted within the opening 52.

Figure 13:
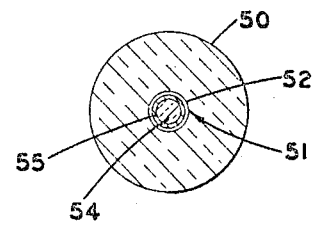

FIG. 13 illustrates a cross section view of the optically insulated fiber 51 inserted within the opening 52 of the tube 50. The optically insulated fiber 51 includes a transparent core 54 which is fused as a unit with the casing 55 formed of a glass material having a different index of refraction. The outside dimension of the fiber 51 is slightly smaller than the internal dimension of the hole 52. The clearance can be smaller than shown in the view which is merely to indicate that the two elements are separate during the initial step of this method.

Figure 14:
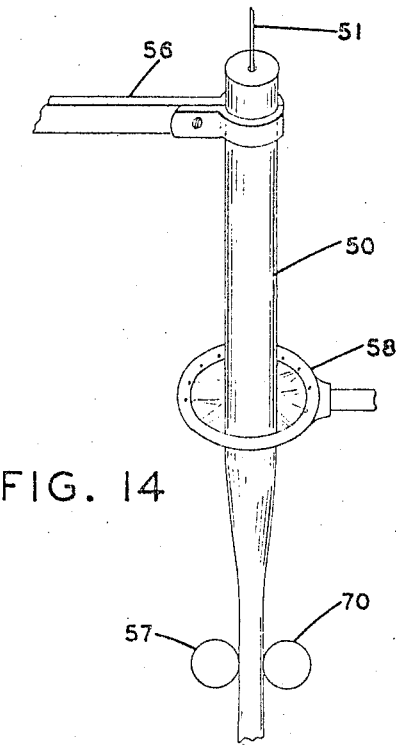

FIG. 14 illustrates a fiber 51 received within the tube 50 held under tension. A clamp 56 supports the upper end of the tube 50 and the rollers 57 engage the lower end. The burner 58 surrounds the tube 50 and is placed adjacent to the lower end of the tube 50. The burner flame is directed inwardly on the tube 50 to fuse the fiber 51 within the tube 50. The rollers 57 and 70 grip the unitized structure and elongate the tube 50 and the fiber 51 as the two elements fuse together. Any gases formed within the opening 52 rise and are expelled at the upper end of the hole 52. The tube 50 and fiber 51 elongate at an equal rate and the degree of elongation may be controlled by the amount of heat applied and the length of time of the application of the heat as the lower end of the unitized structure relative to clamp 56. In this manner any size of aperture may be made by this process. Elongation may only be slight to provide a fusing of the two elements together to provide unitized structure, or elongation may be quite extensive to provide a very small aperture.

Figure 15:
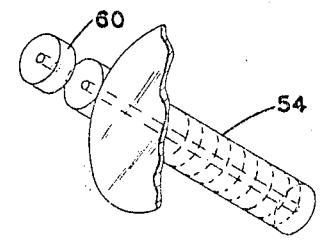

FIG. 15 illustrates a means for cutting the various discs from unitized structure 59. The unitized structure may be cut to any desired thickness to provide apertures of the appropriate size desired.

Figure 16:
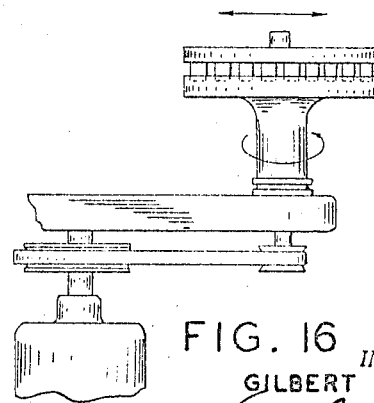

The plurality of discs then are mounted on the grinding and polishing device illustrated in FIG. 16. The device in FIG. 16 operates in substantially the same manner as those illustrated in the previous versions.

By the processes as illustrated it is apparent that a very efficient light transmitting medium may be employed as the aperture. The aperture is optically insulated prior to the fusion within the encasing element. The opaque substant could be any desired material which operates satisfactorily. The latter two versions whereby a glass fiber and a glass tube are employed provide an aperture which will operate at a fairly high temperature. The elements are unitized in a disc form of the desired cross-sectional diameter of the fiber. The aperture being filled with a solid light transmitting medium presents no problem to filling with the foreign substance. The external surfaces of the fiber may be readily cleaned if any foreign substance may deposit on the surfaces. The number of discs constructed in this manner from one tube and fiber is large as the length of the tube and fiber are the determining factors.

The above described method for constructing an aperture is illustrative and not restrictive in setting forth the invention covered herein. Other modifications may illustrate and describe this invention without departing from the spirit of the invention. All equivalent disclosures falling within the principles of the invention are considered to be a part thereof.

I claim:

1. A method of making thick walled aperture discs for use in an optical system comprising, placing an optically insulated transparent fiber in a thick walled opaque hollow member, continuously fusing and elongating said fiber with said member from one end to the other and removing the gas from the hole in said member while forming a composite structure, severing aperture discs having the desired optical length from said composite structure across the axis of the structure, polishing the end surfaces on said aperture discs to thereby provide a plurality of aperture discs.

2. A method of making aperture discs for use in an optical system comprising, placing a transparent fiber having an optically insulating coating in an opaque thick walled tube, positioning one end of said fiber and said tube higher than the other, continuously fusing and elongating said tube and said fiber from the lower end upward to permit the escape of gas from the upper end of the opening receiving said fiber and to unitize said fiber with said tube into a composite structure, cutting a plurality of aperture discs from said composite structure in planes normal to the axis of said structure, grinding and polishing the end surfaces of said plurality of discs to provide a plurality of aperture discs.

3. A method of making aperture discs for use in an optical system comprising, placing an optically insulated transparent fiber in an opaque thick walled tube, placing the tube and the fiber in a substantially vertical position, heating the outer periphery of said tube from the lower end upward and continuously fusing the tube and the fiber into a composite structure while permitting gas to escape from the upper end of the opening in said tube, simultaneously elongating said tube and said fiber to a desired length and reducing the cross-section of said composite structure, slicing a plurality of aperture discs in planes normal to the longitudinal axis of said composite structure, grinding and polishing the end surfaces of said discs to provide aperture disc having a light transmitting medium and cross-sectional area defined by said fiber.

References Cited by the Examiner

UNITED STATES PATENTS

| | | | |
|---|---|---|---|
| 1,994,164 | 3/1935 | Bailey | 264—248 |
| 2,825,260 | 3/1958 | O'Brien | 88—1 |
| 2,992,561 | 7/1961 | Norton | 49—79 |
| 2,992,956 | 7/1961 | Bazinet. | |
| 3,037,241 | 6/1962 | Bazinet et al. | |
| 3,038,236 | 6/1962 | Breen | 264—171 |

OTHER REFERENCES

Kapany, N. S.: Optica Acta, vol. 7, No. 3, July 1960, pages 210 and 211 relied on.

ROBERT F. WHITE, *Primary Examiner.*

EMIL G. ANDERSON, ALEXANDER H. BRODMERKEL, *Examiners.*